Oct. 19 1948.  H. J. DE N. McCOLLUM  2,451,629
SECTIONAL HOT AIR HEATER
Filed June 11, 1943  3 Sheets-Sheet 1
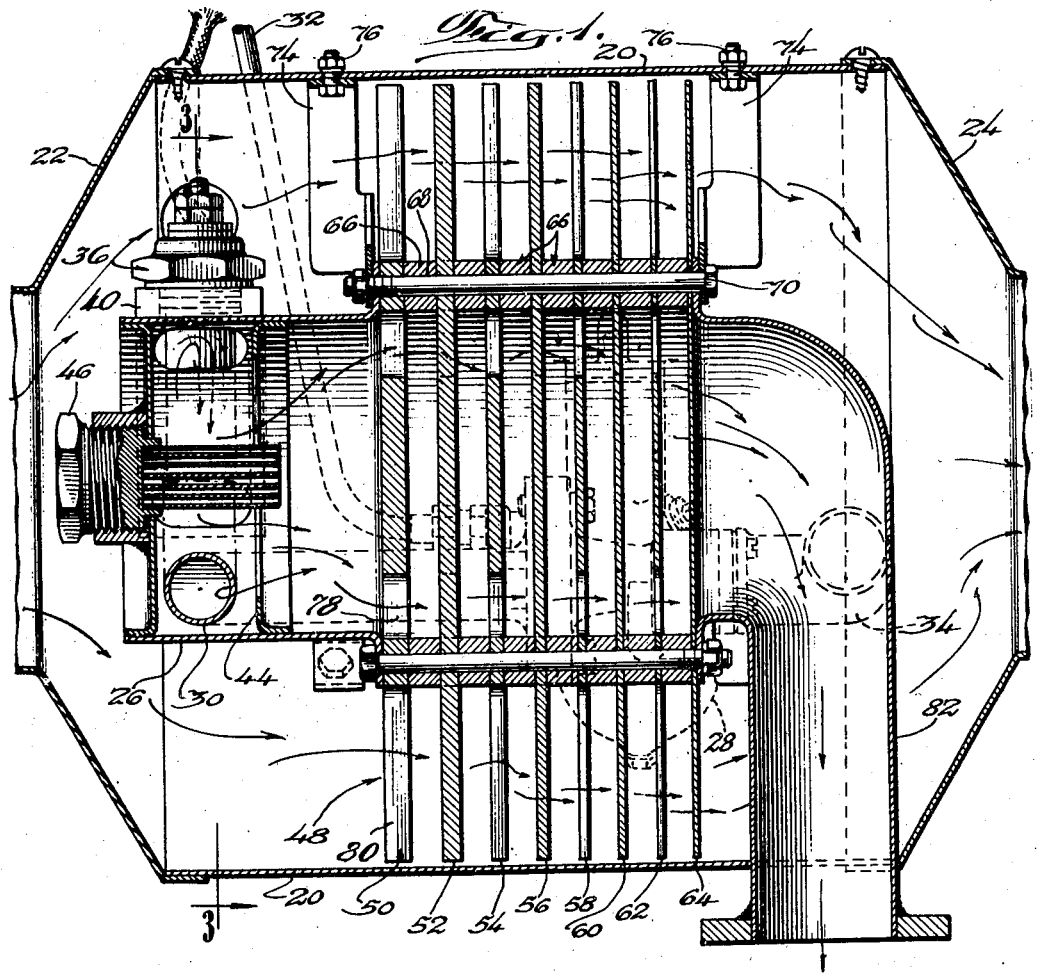
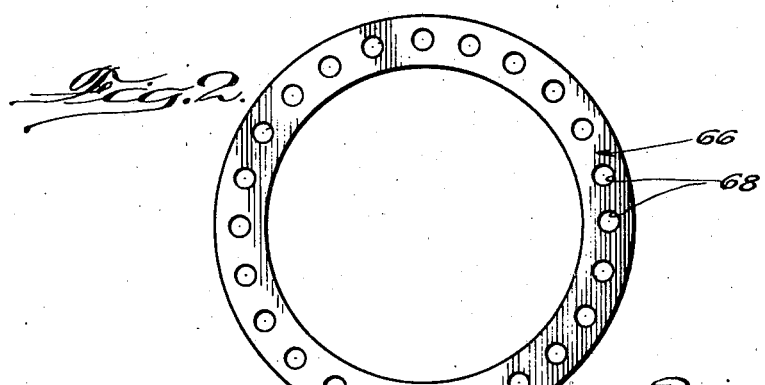

Oct. 19 1948.  H. J. DE N. McCOLLUM  2,451,629
SECTIONAL HOT AIR HEATER
Filed June 11. 1943  3 Sheets-Sheet 2
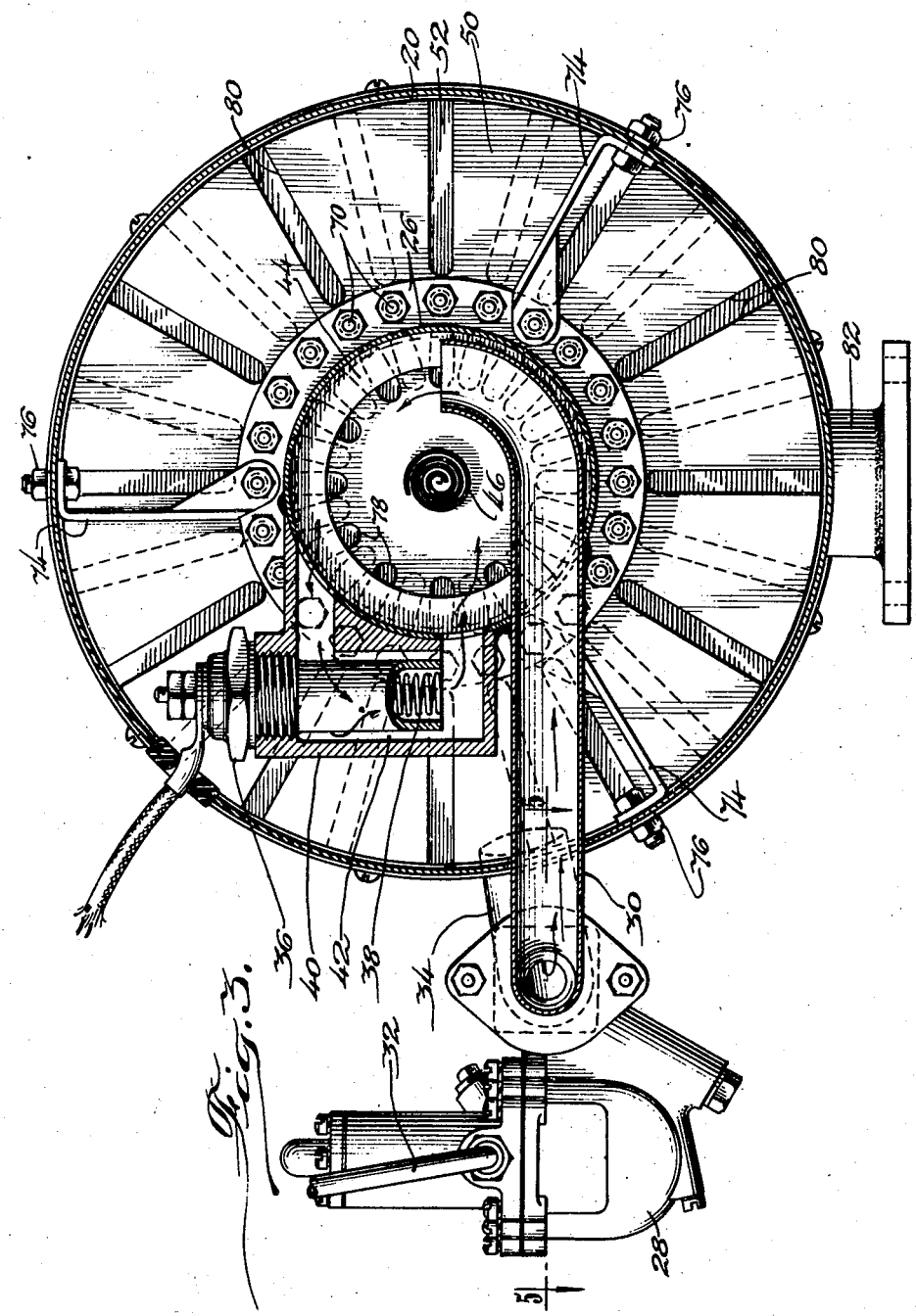

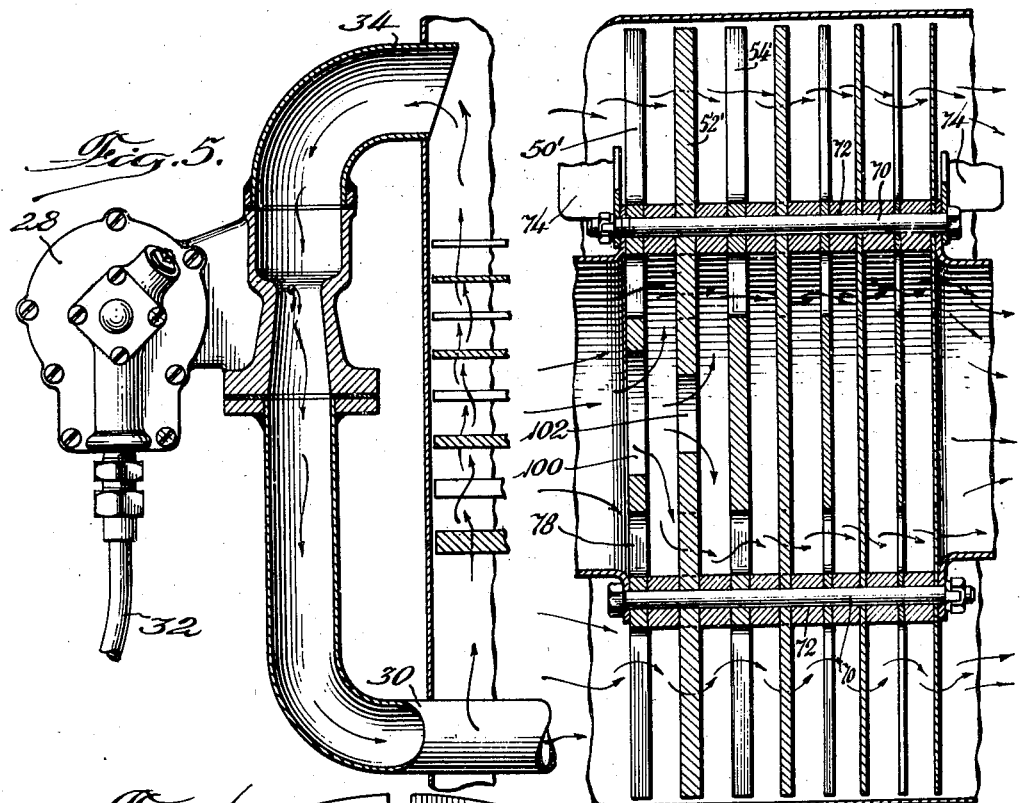
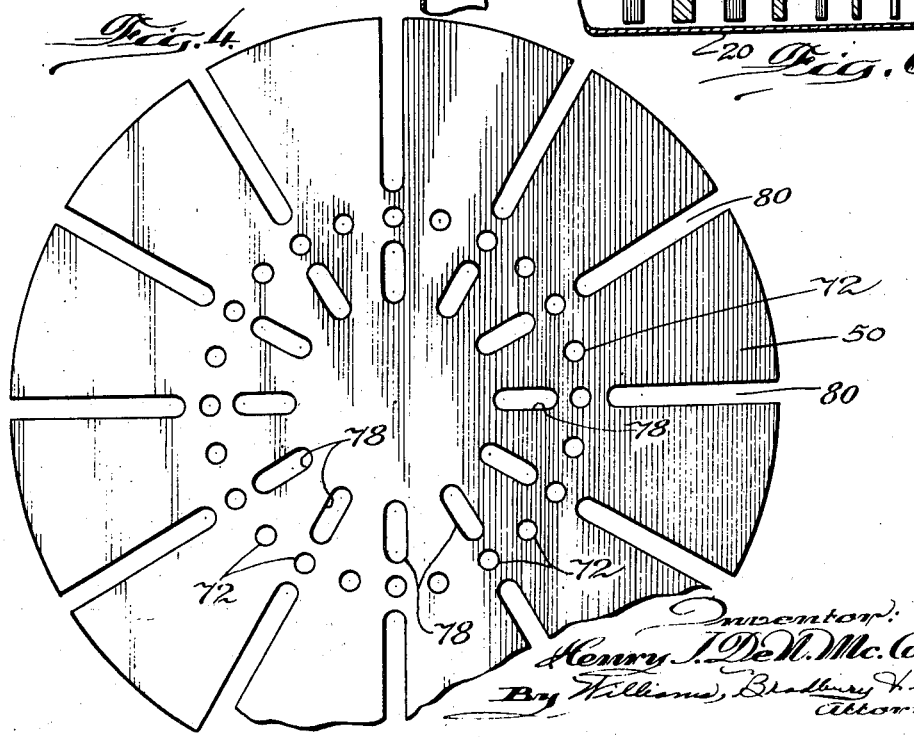

Patented Oct. 19, 1948

UNITED STATES PATENT OFFICE 2,451,629

2,451,629

SECTIONAL HOT-AIR HEATER

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application June 11, 1943, Serial No. 490,440

2 Claims. (Cl. 126—116)

My invention relates to heating apparatus and is more particularly concerned with heating apparatus having heat exchangers and internal combustion heaters for heating the cabins of airplanes and other spaces in vehicles and stationary structures.

An object of my invention is to provide a new and improved heating apparatus which is inexpensive to manufacture, light in weight and highly efficient.

Another object of my invention is to provide a new and improved heat exchanger which is extremely compact and which can be used in a heater occupying a minimum space.

Another object of my invention is to provide a new and improved heat exchanger which can be readily manufactured and assembled by conventional machines and processes.

Other objects and advantages will become apparent as the description proceeds.

In the drawings:

Fig. 1 is a longitudinal section through one form of heater embodying my invention;

Fig. 2 is an elevational view showing one of the spacer rings of the heat exchanger;

Fig. 3 is a transverse, sectional view taken on the line 3—3 of Fig. 1;

Fig. 4 is an elevational view of one of the plates of the heat exchanger;

Fig. 5 is a partial, horizontal section taken on the line 5—5 of Fig. 3; and

Fig. 6 is a longitudinal, sectional view through a part of a heater having a modified form of heat exchanger;

The heater shown in Figs. 1 to 5, inclusive, of the drawings comprises a cylindrical casing 20 of sheet metal or other suitable material and having its lefthand or inlet end connected to the tapered outlet 22 of an air supply pipe into which ventilating air is directed by a ram, blower, or in any other suitable manner. The righthand or outlet end of the casing 20 is connected to the tapered inlet 24 of a ventilating air pipe leading to one or more spaces to be heated through any suitable duct having open or shutter controlled outlets, as desired.

A combustion chamber 26 is located in the lefthand end of the casing 20 and is supplied with a combustible mixture by a carburetor 28 connected to the combustion chamber by way of an induction tube 30. The carburetor 28 is connected with any suitable source of fuel supply by a pipe 32 and an air inlet pipe 34 furnishes heated air to the carburetor from the outlet end of the casing 20.

The combustible mixture delivered to the combustion chamber 26 through the induction tube 30 is ignited by the usual electrical igniter plug 36 having a hot wire 38 located in its lower end. This plug is screwed into a housing 40 attached to the cylindrical wall of the combustion chamber and providing a pocket 42 in which the lower end of the plug is located. This pocket communicates at top or bottom with the interior of the combustion chamber, as clearly shown in Fig. 3 of the drawings. A ring 44 tends to prevent the escape of liquid fuel from the lefthand end of the combustion chamber and serves to direct the mixture delivered by the induction tube into the pocket containing the electrical igniter. The re-igniter 46 is provided to maintain combustion after the igniter has been disconnected from its source of current by the usual thermostatic switch.

The righthand or open end of the combustion chamber is attached to the lefthand end of a heat exchanger indicated generally by reference numeral 48. This heat exchanger is illustrated as comprising a plurality of plates 50, 52, 54, 56, 58, 60, 62 and 64 illustrated as being of decreasing thickness from left to right, as viewed in the drawings. Each pair of plates is supported by a spacer ring 66 having a circularly arranged series of holes 68 for receiving the bolts 70 which clamp the plates and spacer rings together. The plates are provided with similar holes 72 which receive these bolts 70. The bolts 70 also serve to attach the combustion chamber to the lefthand end of the heat exchanger and to attach the combustion chamber and heat exchanger to mounting brackets 74 secured to the casing 20 by bolts 76, or in any other suitable manner.

As best shown in Fig. 4, each of the plates has a circular series of gas slots 78 providing passages for the hot gases issuing from the combustion chamber. Each plate also has an annular series of air slots 80 providing passages for the ventilating air entering the heater from the air supply pipe 22. There are twice as many bolt holes 72 as there are gas slots 78 or air slots 80 and in assembling the plates 50 to 64, inclusive, alternate plates are rotated through an angle equivalent to the distance between adjacent bolt holes 72 so that the gas slots and air slots of one plate are opposite solid portions of the adjacent plates. This arrangement is clearly shown in Fig. 1 and causes both the hot products of combustion and the ventilating air to follow tortuous paths through the heat exchanger to increase the transfer of heat to and from the heat exchanger plates.

The plates and spacer rings may be made of any suitable material which should preferably have a high coefficient of heat conductivity to provide maximum efficiency. I have found that an aluminum alloy forms a desirable material since it affords good heat conductivity with light weight and this combination is particularly desirable where the heater is to be used for aircraft or similar purposes where weight is an important factor. The bolts 70 may also be made of aluminum alloy, but are preferably made of steel to provide greater strength. Steel also has the advantage of expanding less than aluminum so that increase in temperature causes the plates and spacer rings to be pressed together more firmly and contributes to preventing the escape of combustion gases into the ventilating air passages. It is to be understood, however, that the particular metals herein referred to are cited only for purposes of illustration and that the plates, spacer rings and bolts may be made of any other suitable materials.

The plate 50 which is closest to the combustion chamber receives heat radiated from this chamber and also is contacted by the products of combustion while these gases are at their highest temperature. In order to prevent overheating of this plate, I preferably make this plate relatively thick to increase the cross section of the metal through which the heat is conducted without substantially increasing the surface of the plate exposed to radiated heat or the hot gases issuing from the combustion chamber. The succeeding plate 52 receives only a slight amount of radiated heat from the combustion chamber and the gases reaching this plate have been slightly cooled. This plate accordingly can be made somewhat thinner than the plate 50. The plates 54 through 64 receive no radiated heat from the combustion chamber and the gases contacting these plates become successively cooler as they pass through the heat exchanger. In order to provide maximum efficiency therefor, these plates are made successively thinner. This variation in the thickness of the plates of the heat exchanger provides maximum efficiency with a minimum of weight and prevents overheating of any plate.

After the hot products of combustion issuing from the combustion chamber have passed through the gas slots 78 in all of the plates and have given up most of their heat to the heat exchanger, these gases enter an outlet pipe 82 and pass to atmosphere through this pipe and any suitable exhaust pipe attached thereto. The outlet pipe 82 is also attached to the heat exchanger by bolts 70. The particular heat exchanger shown is illustrated as having eight plates, although this number may be varied as desired to suit different conditions. Because of the high efficiency of this type of heat exchanger, a very short and compact heat exchanger is effective to transfer a large quantity of heat from the hot products of combustion to the ventilating air and this feature of my novel heat exchanger makes it possible to design a heater of minimum size for a given heat output.

In the modification of Fig. 6, the first three plates 50', 52' and 54' are made of the same thickness, but the plate 50' has a large central gas opening 100 in addition to the usual gas slots 78 and the second plate 52' has a somewhat smaller central gas opening 102 in addition to the usual gas slots 78. The central openings 100 and 102 reduce the amount of heat transferred to the plates 50' and 52' so that these plates need be no thicker than the plate 54' which corresponds in thickness to the plate 54 of the previous embodiment. The arrangement of Fig. 6 has the advantage of reducing somewhat the resistance to gas flow through the heater and permits the heater to be operated from the lower pressure source of air supply.

While I have described two embodiments of my invention, it is to be understood that my invention is not limited to the particular details shown and described, but may assume numerous other forms and that my invention includes all variations and modifications coming within the scope of the appended claims.

I claim:

1. Compact, high output heating apparatus of the class described, comprising means providing a combustion chamber having a flange defining an outlet end, a heat exchanger secured to said flange and comprising a plurality of plates each having an annular series of bolt holes therethrough and having gas passages spaced radially from opposite sides of alternate bolt holes, the gas passages of successive plates being staggered so that the passages of one plate are opposite imperforate portions of the adjacent plates, spacer rings interposed between said plates and separating the passages on opposite sides of the bolt holes through said plates, bolts passing through said plates, spacer rings and flange for holding said plates and spacer rings in sealing engagement with each other and with said means, the gas passages inward of said bolt holes being in communication with said combustion chamber, and means for directing air through the gas passages located outside of said bolt holes.

2. Compact, high output heating apparatus of the class described, comprising means providing a combustion chamber having an outlet end, a heat exchanger secured to said combustion chamber means and comprising a plurality of discs of decreasing thickness from the combustion chamber end of said heat exchanger to the other end thereof, each of said discs having an annular series of bolt holes therethrough and having gas passages spaced radially from opposite sides of alternate bolt holes, the gas passages of successive discs being staggered so that the passages of said discs are opposite imperforate portions of the adjacent discs, spacer rings interposed between said discs and separating the passages on opposite sides of the bolt holes through said discs, said rings being of substantially the same diameter as said outlet end, bolts passing through said discs and spacer rings for holding said plates and spacer rings in sealing engagement with each other, the gas passages inward of said bolt holes being in communication with said combustion chamber whereby products of combustion formed therein can flow through said interior passages, and means for directing air through the gas passages located outside of said spacer rings whereby air flows through said last-named passages in the same direction as products of combustion flow through said interior passages.

HENRY J. DE N. McCOLLUM.

REFERENCES CITED

The following references are of record in the file of this patent:

UNITED STATES PATENTS

| Number | Name | Date |
|---|---|---|
| 414,806 | Gillet | Nov. 12, 1889 |
| 604,823 | Forbes | May 31, 1898 |
| 1,524,520 | Junkers | Jan. 27, 1925 |
| 1,734,274 | Schubart | Nov. 5, 1929 |
| 2,016,164 | Williams | Oct. 1, 1935 |
| 2,160,264 | Furlong | May 20, 1939 |
| 2,369,995 | Arnold | Feb. 20, 1945 |

FOREIGN PATENTS

| Number | Country | Date |
|---|---|---|
| 18,516 | Great Britain | 1888 |
| 207,911 | Switzerland | Mar. 16, 1940 |